(12) United States Patent
Buesseler et al.

(10) Patent No.: US 6,975,888 B2
(45) Date of Patent: Dec. 13, 2005

(54) INTERCHANGEABLE COVER FOR A MOBILE COMMUNICATIONS DEVICE

(75) Inventors: Joshua R. Buesseler, Mercer Island, WA (US); William K. Ford, Bothell, WA (US)

(73) Assignee: Wildseed Ltd., Kirkland, WA (US)

( * ) Notice: Subject to any disclaimer, the term of this patent is extended or adjusted under 35 U.S.C. 154(b) by 371 days.

(21) Appl. No.: 09/933,858

(22) Filed: Aug. 20, 2001

(65) Prior Publication Data

US 2003/0036362 A1 Feb. 20, 2003

(51) Int. Cl.[7] ................................................. H04B 1/38
(52) U.S. Cl. ............................. 455/575.1; 455/550.1; 455/90.1
(58) Field of Search ........................ 455/575.1–575.5, 455/550.1, 90.1–90.3, 575, 550; D14/248, 137, 138; 379/433.11, 446, 452, 437; 206/320; 224/930; 24/306

(56) References Cited

U.S. PATENT DOCUMENTS

| | | | | |
|---|---|---|---|---|
| 4,292,481 A | * | 9/1981 | Barnes et al. | 379/441 |
| D316,999 S | * | 5/1991 | Sarff | D14/138 |
| D321,885 S | * | 11/1991 | Sheldrake | D14/138 |
| 5,140,632 A | | 8/1992 | Anten | |
| 5,173,936 A | * | 12/1992 | Ditzig et al. | 379/433.09 |
| 5,174,483 A | * | 12/1992 | Moore et al. | 24/306 |
| D332,961 S | * | 2/1993 | Peersmann | D18/7 |
| 5,444,866 A | * | 8/1995 | Cykiert | 455/575.5 |
| 5,461,672 A | | 10/1995 | Enokido et al. | |
| 5,653,336 A | * | 8/1997 | Buonaiuto et al. | 206/320 |
| 5,659,887 A | | 8/1997 | Ooe | |
| 5,832,371 A | | 11/1998 | Thornton | |
| 5,923,752 A | * | 7/1999 | McBride et al. | 379/433.11 |
| 5,982,881 A | | 11/1999 | Mischenko | |
| 6,082,535 A | | 7/2000 | Mitchell | |
| 6,101,372 A | | 8/2000 | Kubo | |
| 6,189,755 B1 | * | 2/2001 | Wakefield | 379/446 |
| 6,339,699 B1 | * | 1/2002 | Hirai et al. | 379/433.01 |
| 6,360,083 B1 | * | 3/2002 | Fan | 455/90.1 |
| 6,367,672 B1 | * | 4/2002 | Lind | 224/930 |
| D470,135 S | * | 2/2003 | Buesseler et al. | D14/248 |
| D492,299 S | * | 6/2004 | Eguchi et al. | D14/248 |
| D500,033 S | * | 12/2004 | Eguchi et al. | D14/248 |
| 2001/0029170 A1 | * | 10/2001 | Fujihashi | 455/550.1 |
| 2002/0037738 A1 | | 3/2002 | Wycherley et al. | |
| 2002/0049081 A1 | * | 4/2002 | Heininger | 455/575.1 |
| 2002/0090918 A1 | * | 7/2002 | Grimm | 455/347 |
| 2003/0003864 A1 | * | 1/2003 | Locke | 455/550 |
| 2003/0104791 A1 | * | 6/2003 | Engstrom et al. | 455/90 |

* cited by examiner

Primary Examiner—Edward F. Urban
Assistant Examiner—Lana Le
(74) Attorney, Agent, or Firm—Schwabe, Williamson & Wyatt, P.C.

(57) ABSTRACT

An interchangeable cover for a mobile communications device is provided. The interchangeable cover includes a a resilient three-sided semi-rigid shell having a substantially U-shaped profile adapted to wrap around a substantial portion of a front, back and side of the mobile communications device upon assembly over the device, without requiring any fasteners. In one embodiment, the cover is configured to fit a mobile communications device having a trapezoidal profile, whereby front and back face portions clasp around the front and back of the phone. In accordance with various embodiments, the cover may include holes and slots through which phone buttons pass, dumb buttons, or built-in buttons that enable users to provide inputs to the phone. The three-sided shell provides additional surface area when compared to conventional single-sided faceplates. Accordingly, the cover appears as a more integral part of the phone. Furthermore, the extra surface area may be used for advertisement purposes.

40 Claims, 14 Drawing Sheets

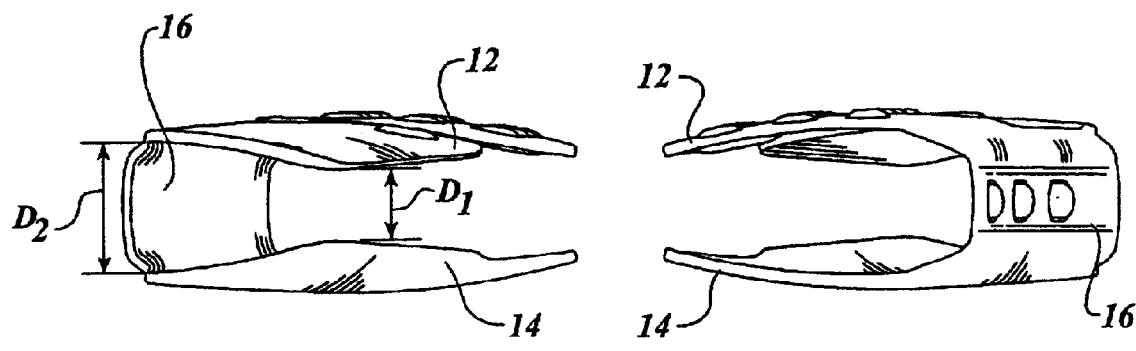
*Fig. 1C*　　　*Fig. 1D*
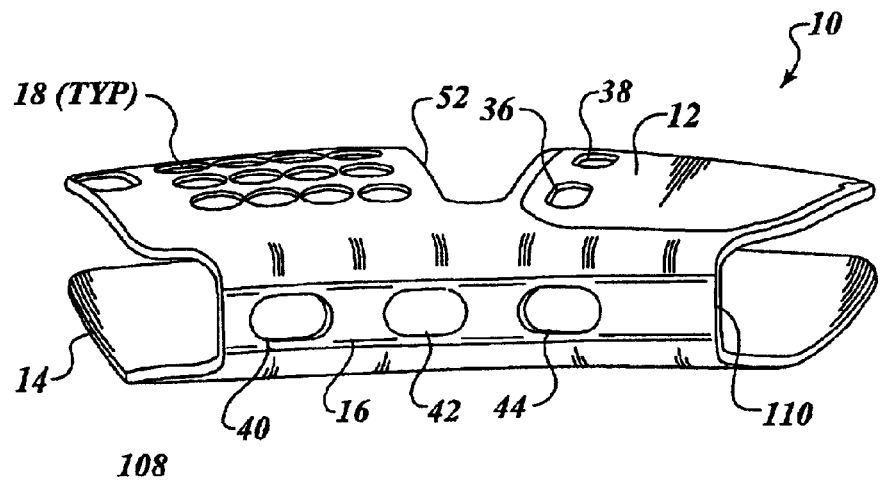
*Fig. 1E*

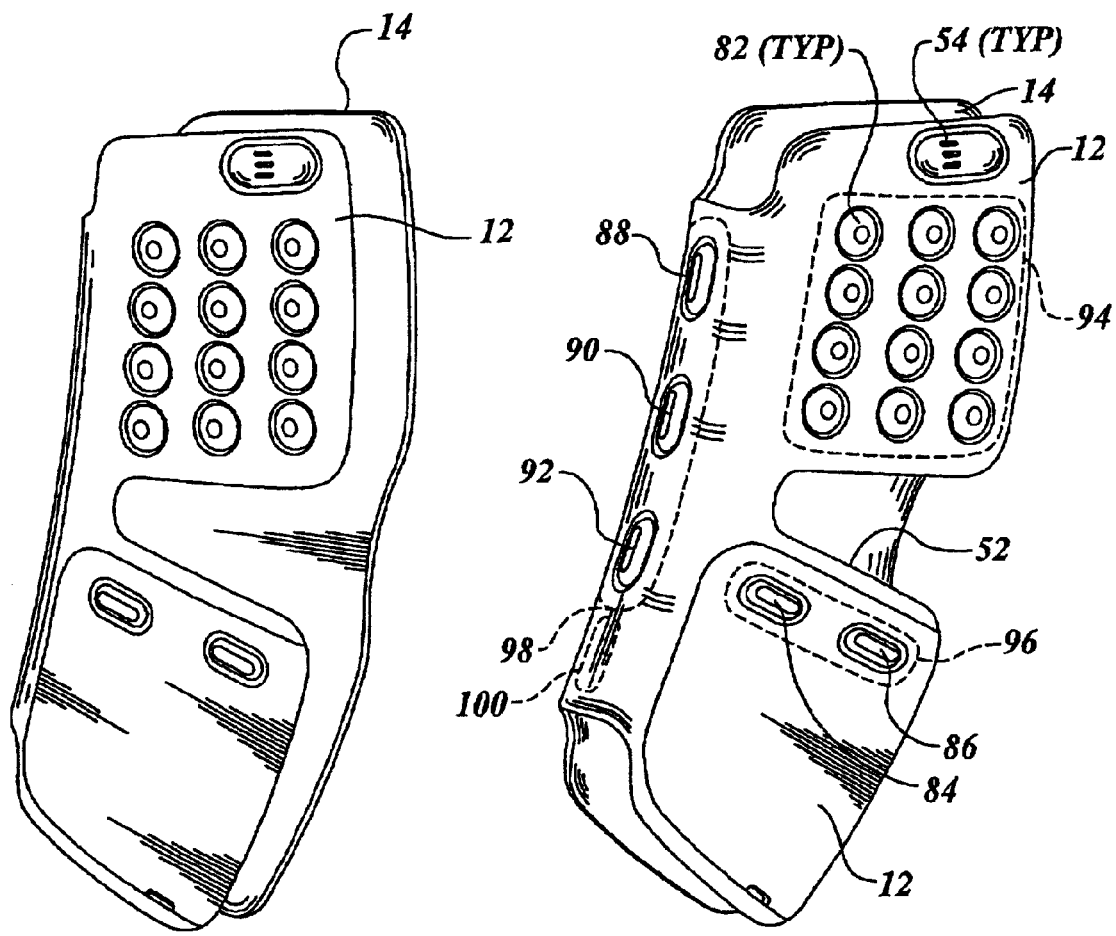
*Fig. 5A*  *Fig. 5B*
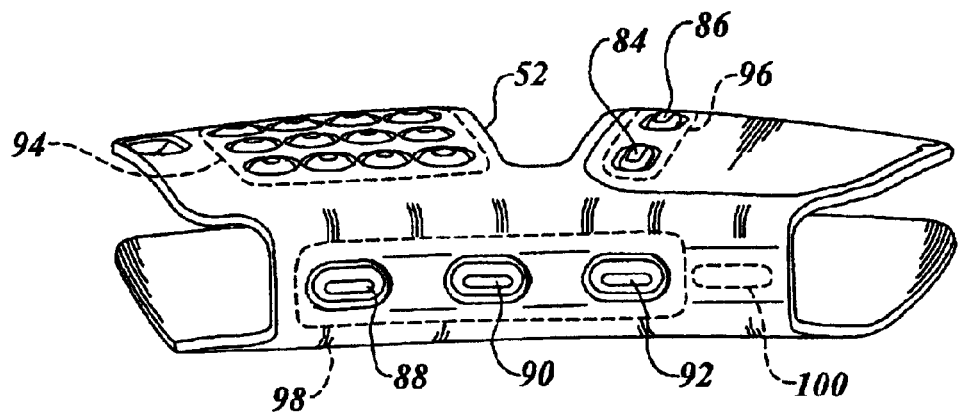
*Fig. 5C*

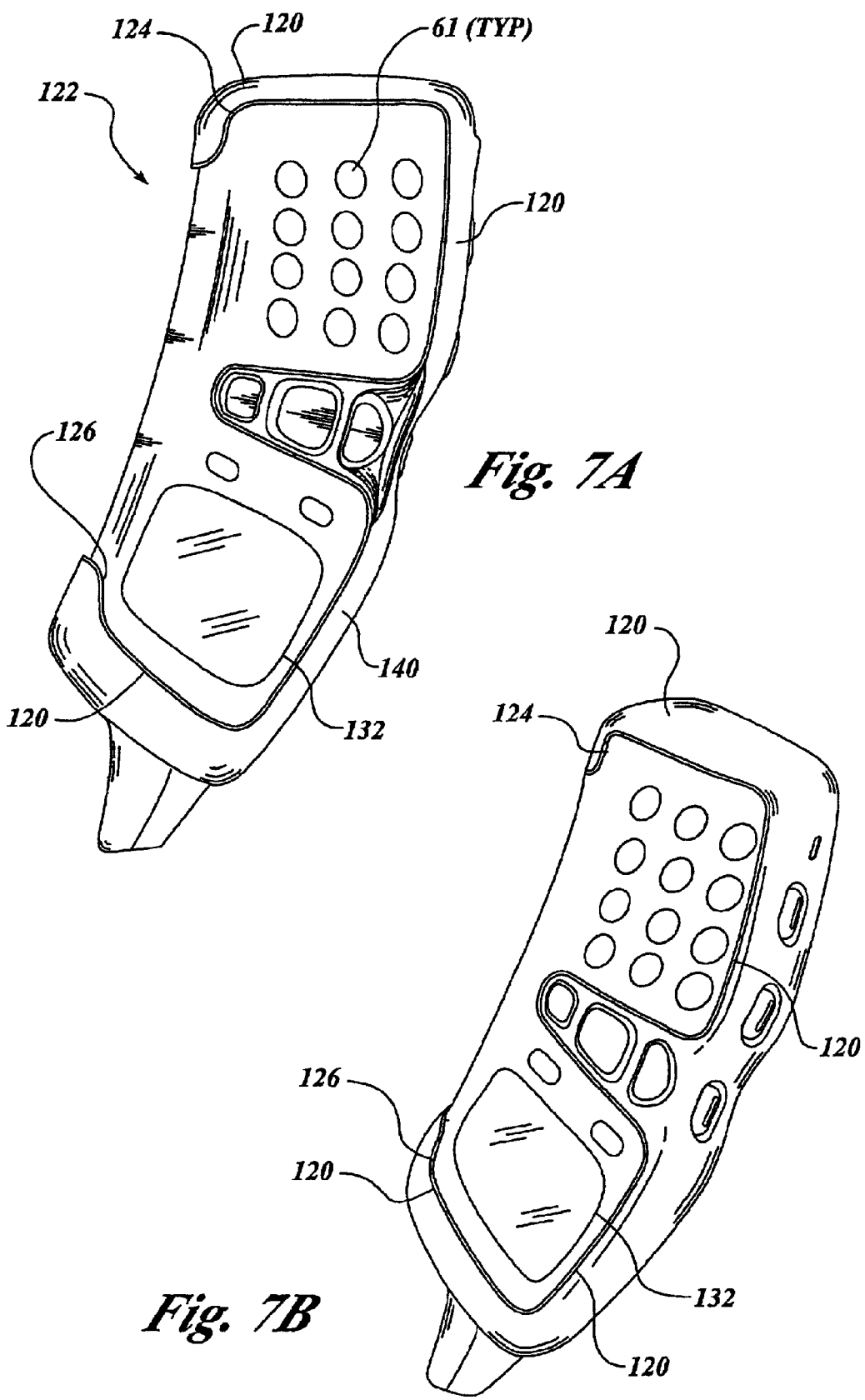

INTERCHANGEABLE COVER FOR A MOBILE COMMUNICATIONS DEVICE

TECHNICAL FIELD

The present invention relates to mobile electronic communication devices, and more particularly, the present invention relates to an interchangeable cover that is used with mobile communications devices, such as cellular phones, PDAs, two-way pagers and pocket PCs.

BACKGROUND

Mobile communications devices, such as cellular phones, wireless-enabled personal digital assistants (PDAs), and two-way pagers, have become very prevalent in many of regions of the world, such as the United States, Asia, and Europe. When such devices were much less common, they were regarded as a status symbol by many of their users. For example, by merely having a cellular phone, a message of importance or success could be projected. In contrast, many of the foregoing mobile communications devices have become a commodity item in today's mobile environment.

Today, many users desire that their cellular phones provide a unique expression of their personality, thereby differentiating the user's phone from a mere commodity item used by lesser people. For example, Nokia produces several phones that include faceplates that may be changed. These faceplates come in a wide variety of colors and patterns, and enable users to personalize their phones by changing an existing faceplate to a new faceplate. However, it is often difficult to change faceplates, and the attachment features of the faceplates may be broken when trying to remove a faceplate or attach a new faceplate to the phone.

The use of interchangeable faceplates is especially popular with the teenage and young adult markets. These markets are also hot for manufacturers that produce goods that include or promote the manufacturer's (or other manufacturer's) marks. For example, many items sold at Old Navy and Ambercrombie and Fitch stores say "Old Navy" or "Ambercrombie and Fitch" on them. In other instances, an article of clothing or similar type item may contain known a well-known logo, such as a soft drink logo (e.g., Coca-Cola), a beer producer logo (e.g., Budweiser), or a sports team logo. By wearing clothing with these marks, individuals are able to express their personalities.

SUMMARY

According to aspects of the current invention, interchangeable covers for mobile communication devices, such as cellular phones, wireless PDA's, two-way pages and pocket PCs are provided. The interchangeable cover includes a a resilient three-sided semi-rigid shell having a substantially U-shaped profile adapted to wrap around a substantial portion of a front, back and side of the mobile communication device upon assembly over the device, without requiring any fasteners. In one embodiment, the cover is configured to fit a device having a trapezoidal profile, whereby front and back face portions clasp around the front and back of the device.

In one embodiment, the interchangeable cover include holes and slots through which device input buttons pass, thereby enabling users to activate the buttons. In another embodiment, a membrane including a plurality of dumb buttons is operatively coupled to the cover upon assembly, whereby user-activation of the dumb buttons causes membrane switches built into the wireless communication device to actuate. In yet another embodiment, various keypad and optional input switches are operatively coupled to the cover, and a connector and appropriate wiring is provided to enable signals produced in response to activation of the buttons to the wireless communication device.

According to further aspects of the invention, the interchangeable cover may be used for advertisement purposes. Noteably, the three-sided configuration provides addition surface area when compared to conventional single-sided faceplates. Furthermore, the extra surface area, particularly the backside, may contain one or more logo's or other indicia corresponding to one or more business entities. Such business entities may advertise their products by distributing interchangeable covers with their indicia or marks on them.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIGS. 1A–1E comprise various views of an interchangeable cover for a mobile phone in accordance with a first exemplary embodiment of the invention in which a plurality of holes and slots are defined to receive corresponding buttons used in operating the mobile phone;

Figure 6A:
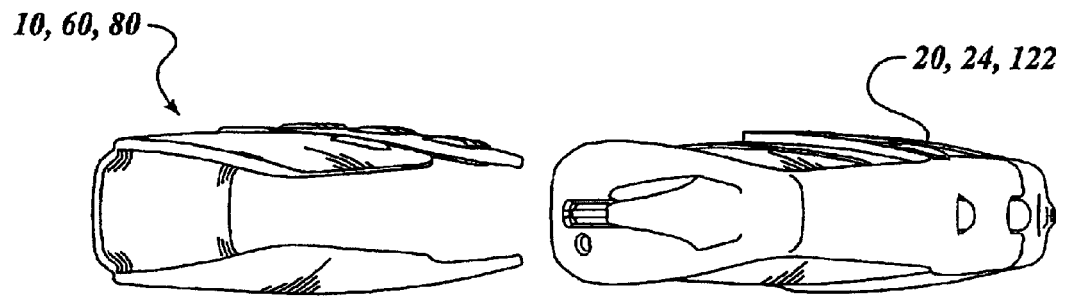
Figure 6B:
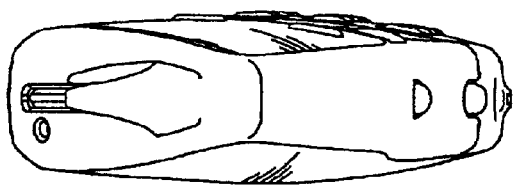
Figure 6C:
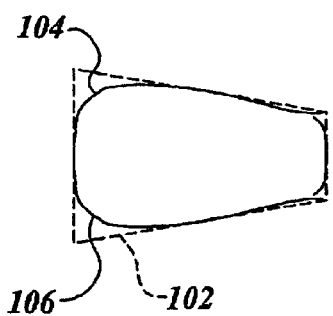
Figure 8A:
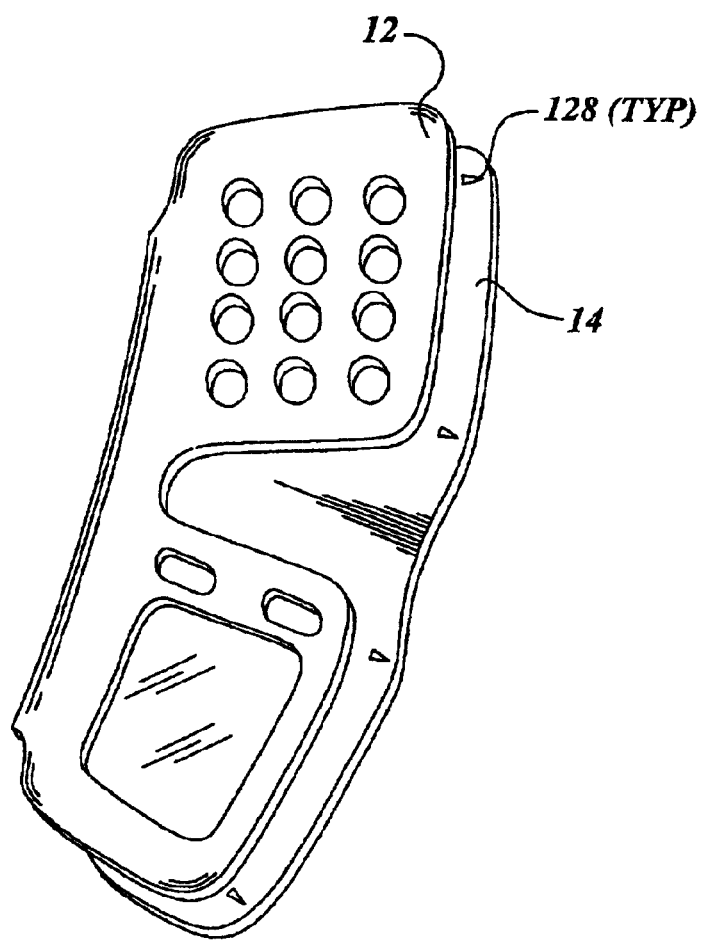
Figure 8B:
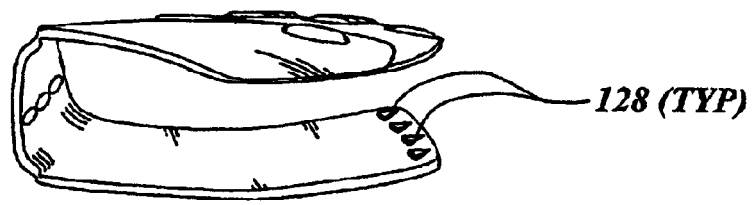
Figures 9A, 9B:
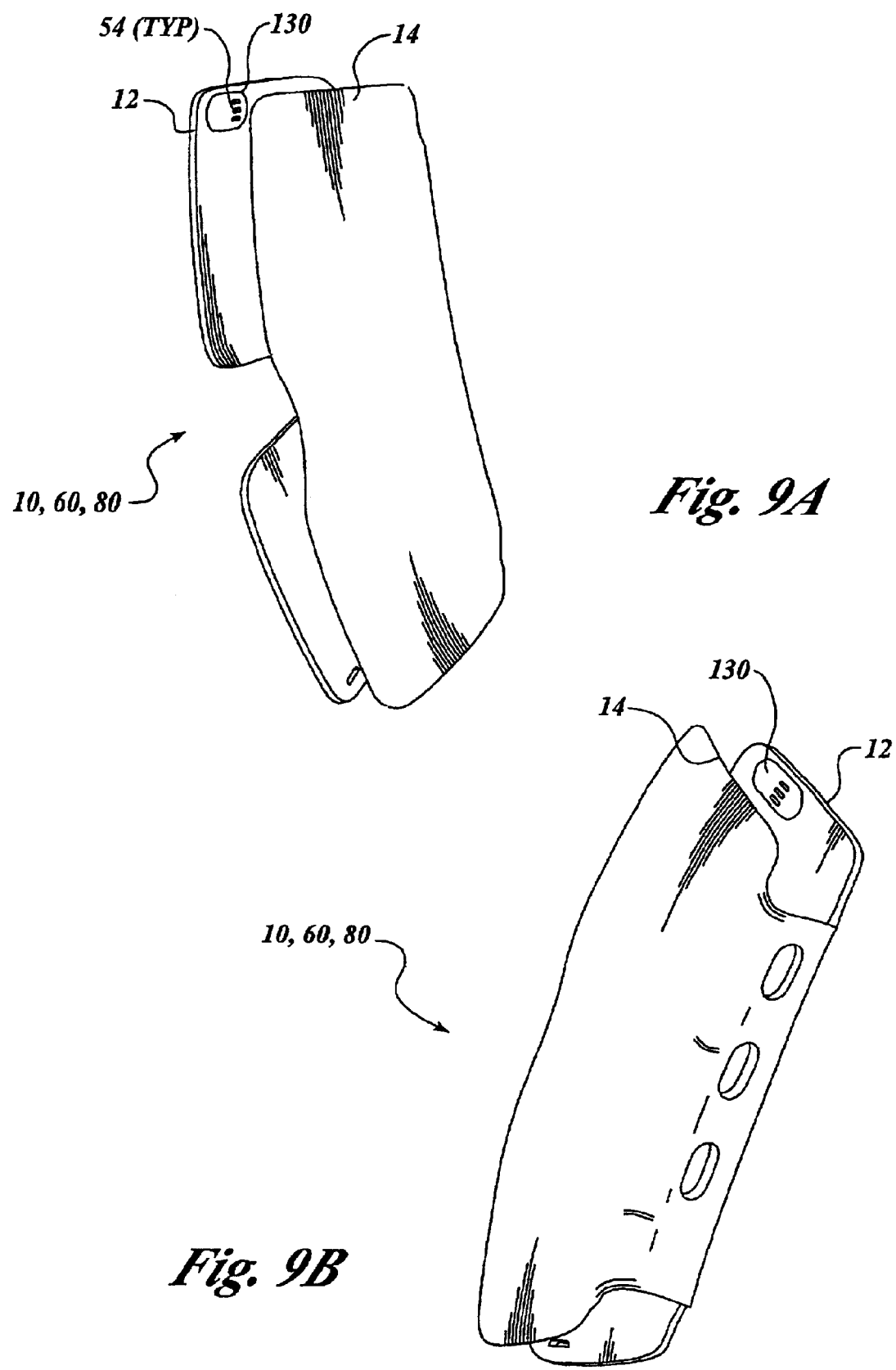
Figure 10:
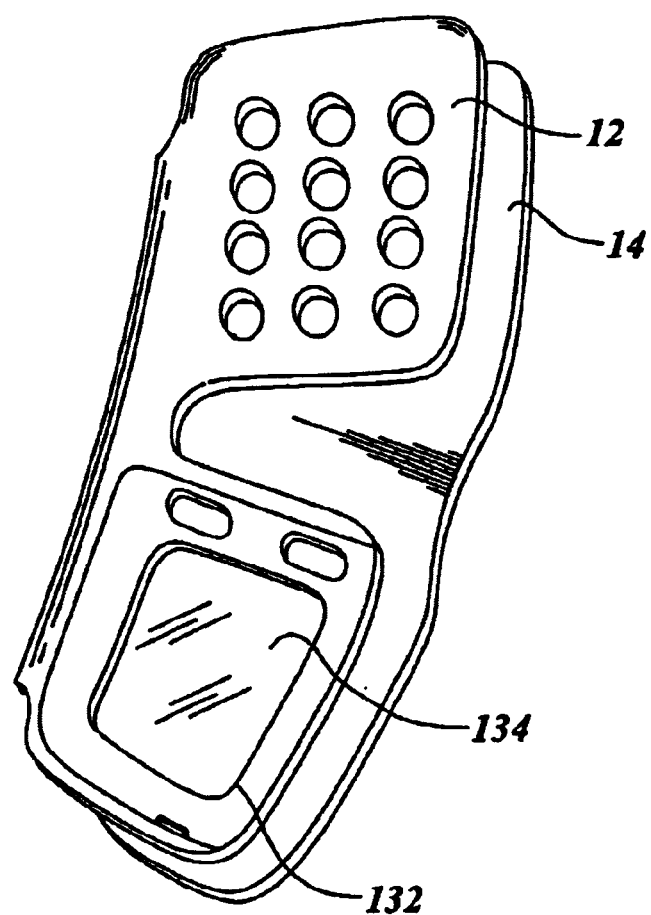
Figure 11:
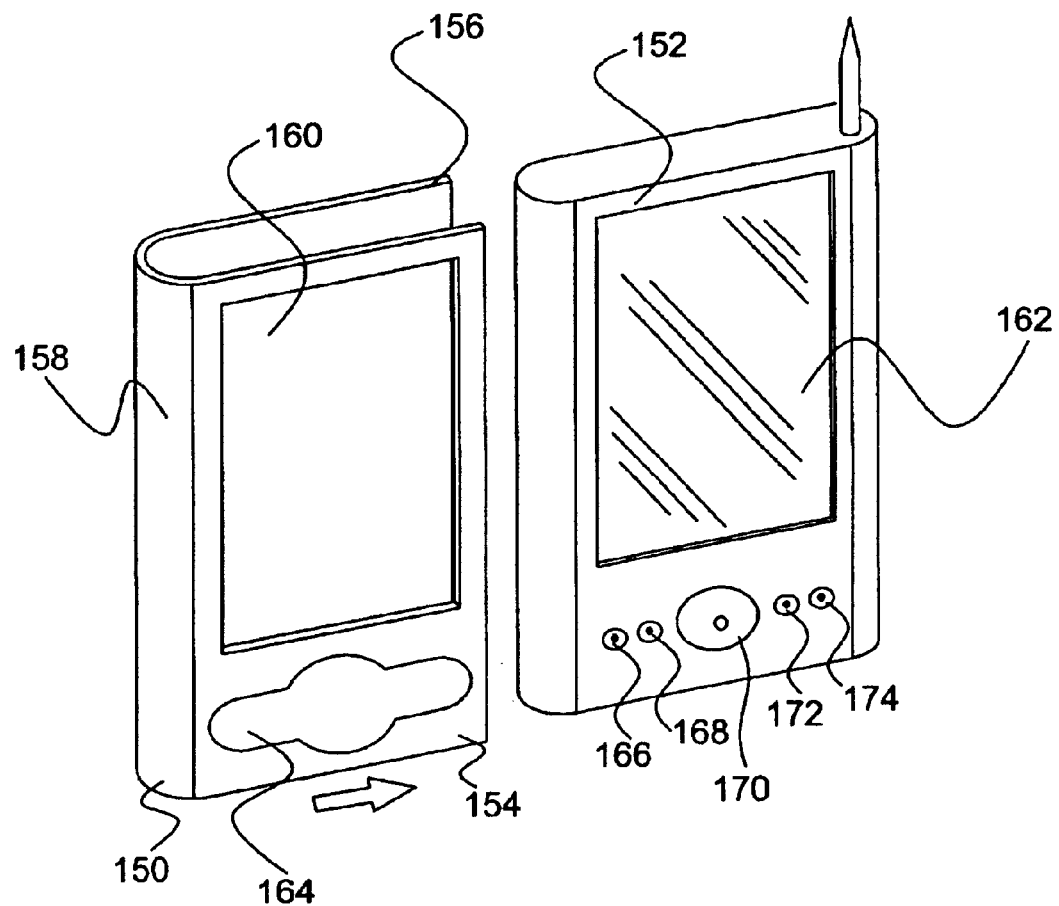
Figure 12:
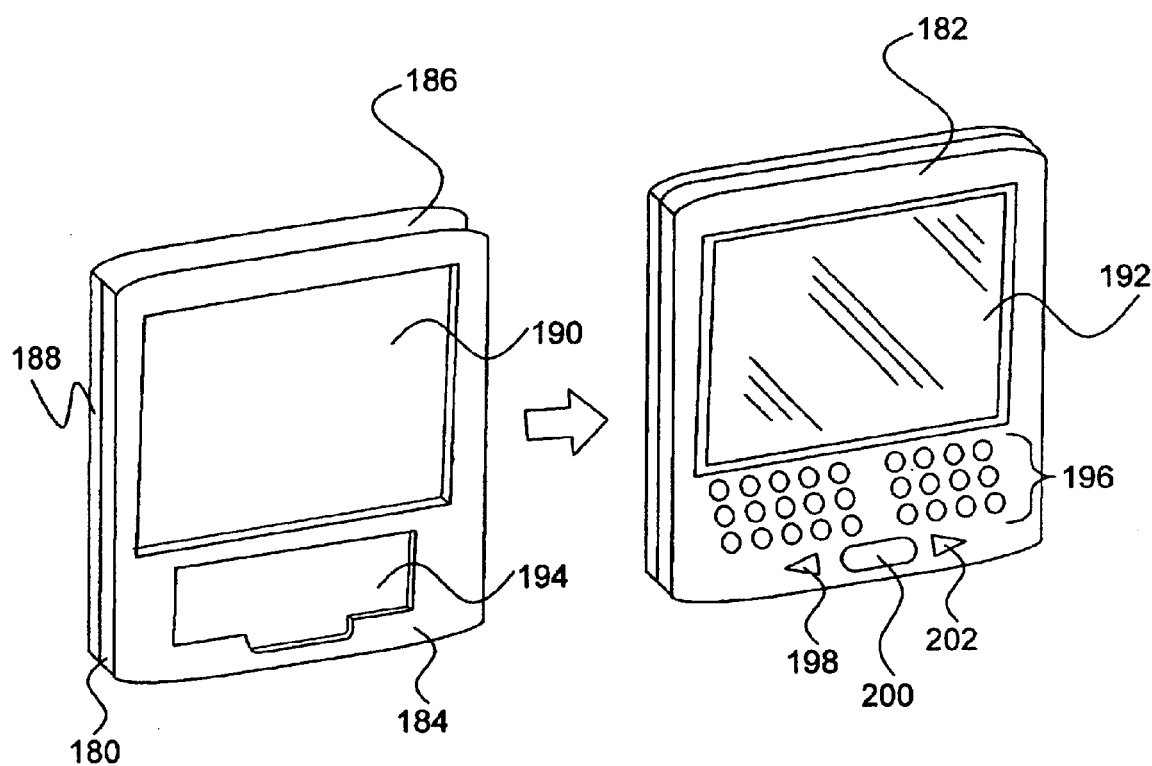
Figure 13A:
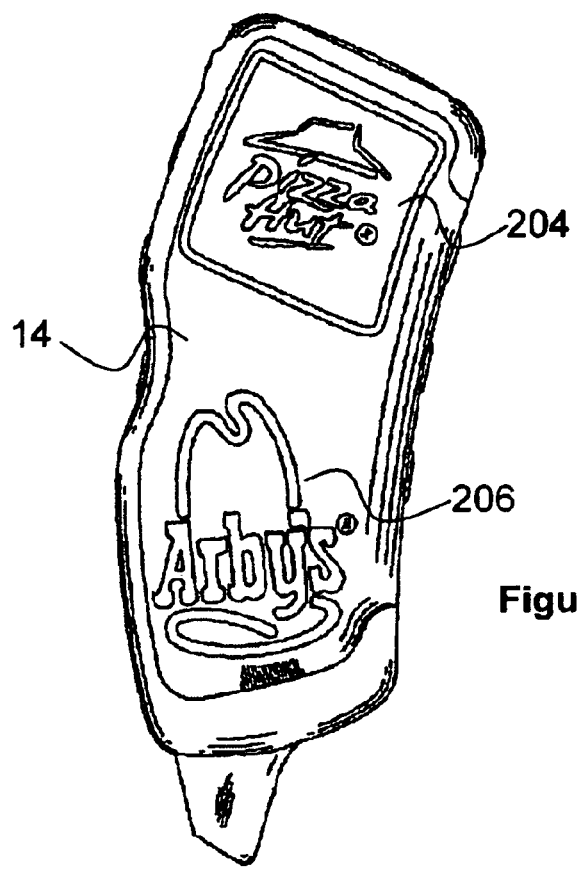
Figure 13B:
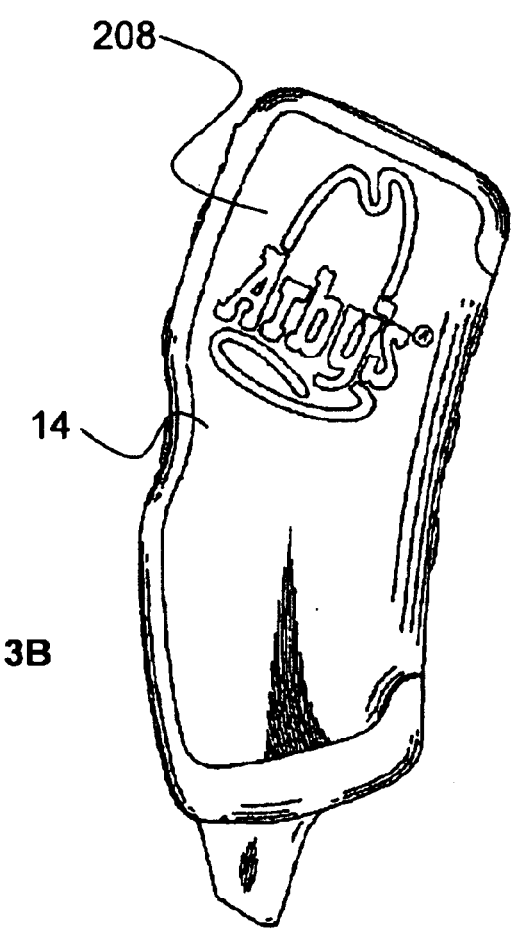

FIGS, 5A–5C depict various views of an interchangeable cover in accordance with a third exemplary embodiment of the invention in which a plurality of buttons are built-into the cover;

FIGS. 6A through 6C are isometric views used to illustrate how an interchangeable cover is assembled to a mobile phone;

FIGS. 7A and 7B are isometric views of a phone body suitable for use with the interchangeable covers of the present invention;

FIGS. 8A and 8B are isometric views of an interchangeable cover that uses a plurality of latches to assist in securing the cover to the mobile phone;

FIGS. 9A and B are isometric views illustrating an embodiment of the invention in which an inwardly extending protrusion is defined in the interchangeable cover;

FIG. 10 is an isometric view of an embodiment of the invention in which an opening and optional lens are included in the interchangeable cover to enable a user to view a display on the mobile phone over which the interchangeable cover is installed;

FIG. 11 is an isometric view of an embodiment of the invention in which the interchangeable cover is adapted to be secured over a PDA device or pocket PC;

FIG. 12 is an isometric view of an embodiment of the invention in which the interchangeable cover is adapted to be secured over two-way wireless pager;

FIG. 13A shows the back side of the interchangeable cover on which a plurality of advertisement logos are displayed; and FIG. 13B shows the back side of the interchangeable cover on which a single advertisement logo is displayed.

DETAILED DESCRIPTION OF THE ILLUSTRATED EMBODIMENTS

Embodiments of an interchangeable cover for use with mobile communication devices such as cellular phones, wireless PDAs, two-way pagers and pocket PCs are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
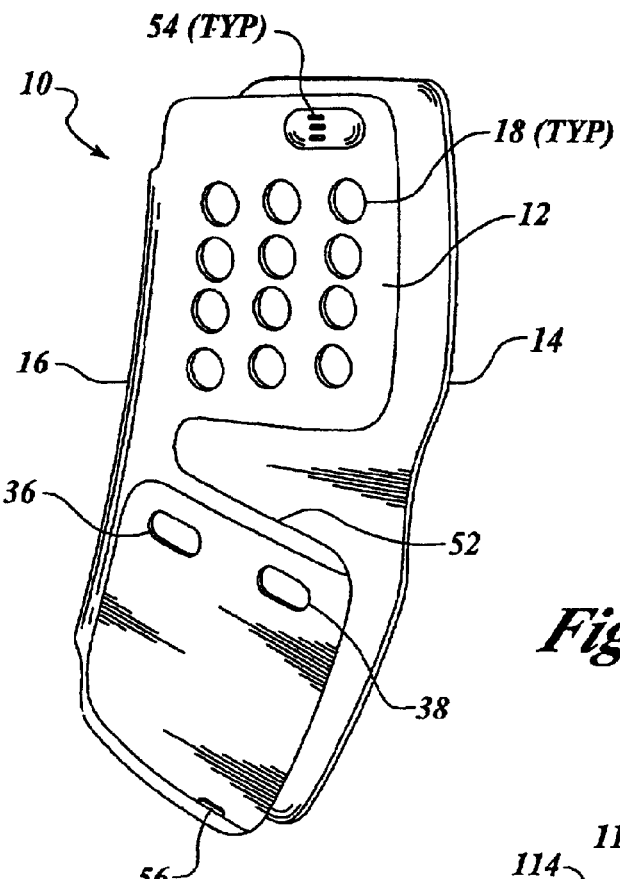

An interchangeable cover 10 in accordance with a first exemplary embodiment of the invention is shown in FIGS. 1A–E. Interchangeable cover 10 comprises a resilient semi-rigid shell having a front face 12 and a back face 14 commonly connected to a side portion 16. As depicted in FIGS. 1C and 1D, interchangeable cover 10 has a substantially "U"-shaped profile. As used herein, substantially "U"-shaped means there are two extending portions connected to a base portion that is substantially perpendicular to the extending portions, and wherein there is a bevel or radius where each extending portion joins the base portion. In one embodiment, the extending portions of the "U" are rotated toward each other such that a distance $D_1$ between the end portions of the "U" is less than a distance $D_2$ at the root of the "U." As explained in further detail below, this configuration is adapted to clasp around a phone that has a substantially trapezoidal profile.

Figure 2A:
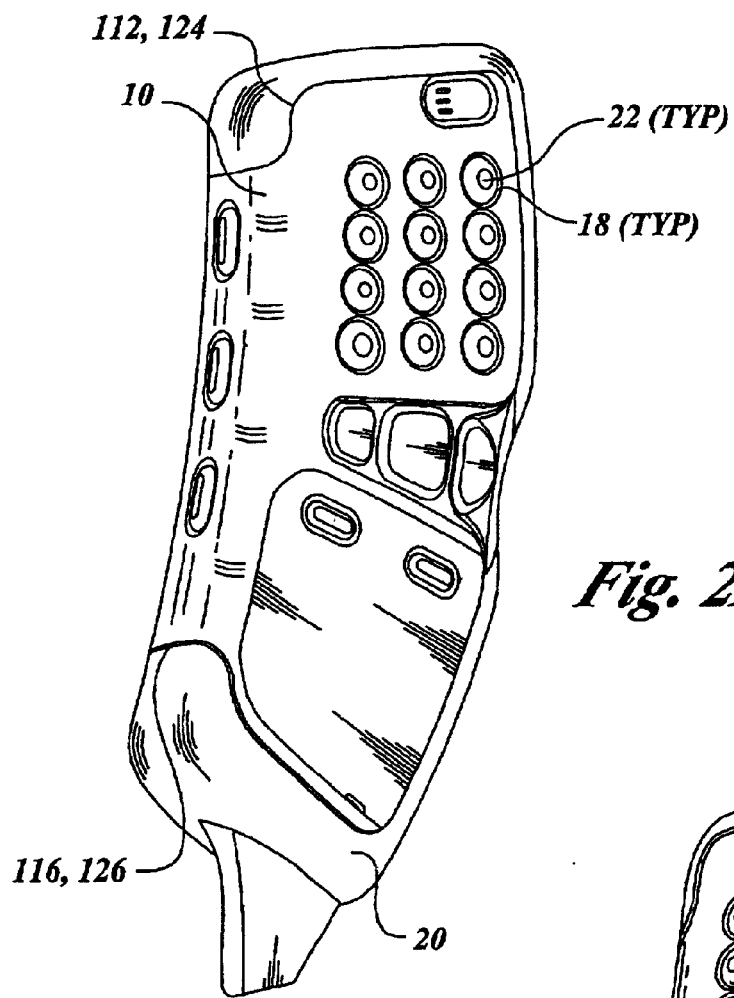
FIGS. 2A and 2B illustrate views of the interchangeable cover of FIGS. 1A–1E upon assembly of the cover over a mobile phone adapted to receive the cover.
Figure 2B:
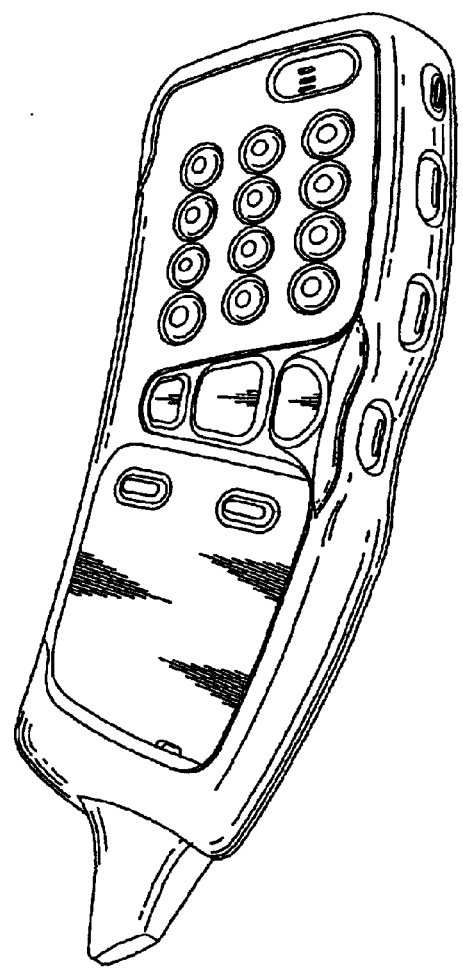

Interchangeable cover 10 includes a plurality of openings 18 through which respective keypad buttons on the mobile phone pass upon assembly of the cover over the phone. For example, an assembled configuration wherein an interchangeable cover 10 is installed over a mobile phone 20 including a plurality of keypad buttons 22 is shown in FIGS. 2A and 2B. Openings 18 enable a user to activate keypad buttons 22 when the interchangeable cover is installed.

Figure 3:
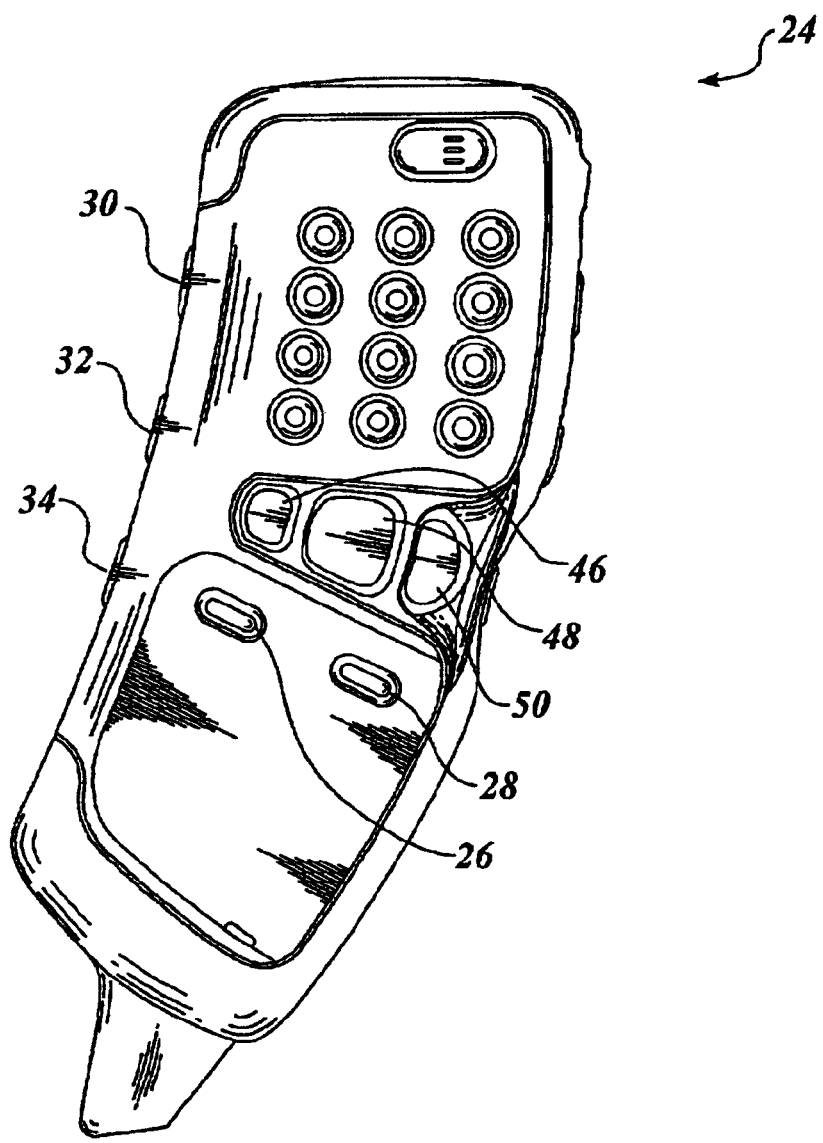
FIG. 3 is an elevational view of a mobile phone including three input buttons disposed over a mid-portion of the front of the phone.

In some configurations, the mobile phone over which the interchangeable cover is installed may include various input buttons in addition to keypad buttons. For example, a mobile phone 24 depicted in FIG. 3 over which an interchangeable cover may be installed includes input buttons 26 and 28 on its face and side input buttons 30, 32, and 34 on its side. Accordingly, interchangeable cover 10 further includes slots 36 and 38 defined in front face 12 and slots 40, 42, and 44 defined in side portion 16.

Figure 1B:
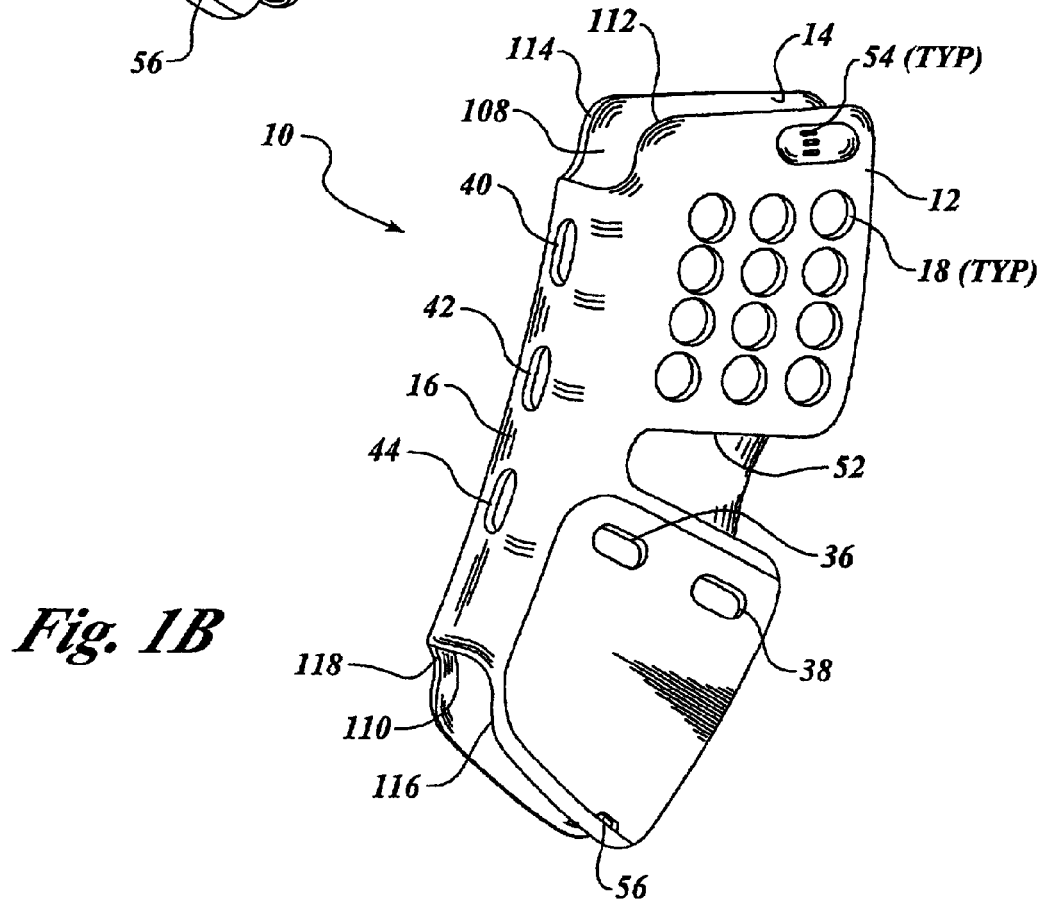

Mobile phone 24 also may include additional buttons, including buttons 46, 48, and 50 disposed about a mid-portion of the front of the phone. In order to accommodate access to these buttons, interchangeable cover 10 may further include a radiused "V"-shaped cutout 52. As depicted in FIGS. 1A and 1B, interchangeable cover 10 also includes one or more speaker slots 54 through which audible signals produced by the mobile phone's speaker may pass, and a microphone slot 56 through which a user's voice may be detected by the mobile phone's microphone.

Figure 4A:
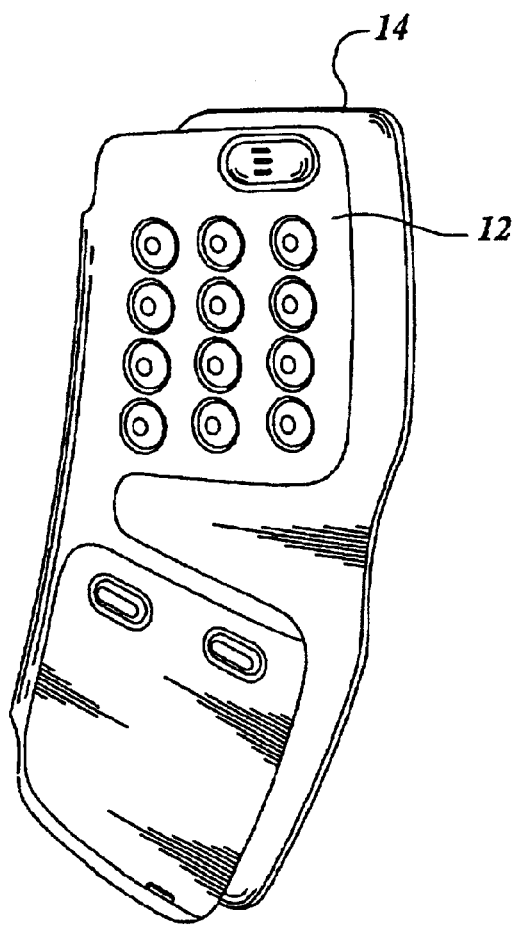
FIGS. 4A–4C depict various views of an interchangeable cover in accordance with a second exemplary embodiment of the invention in which a plurality of "dumb" buttons are defined.
Figure 4B:
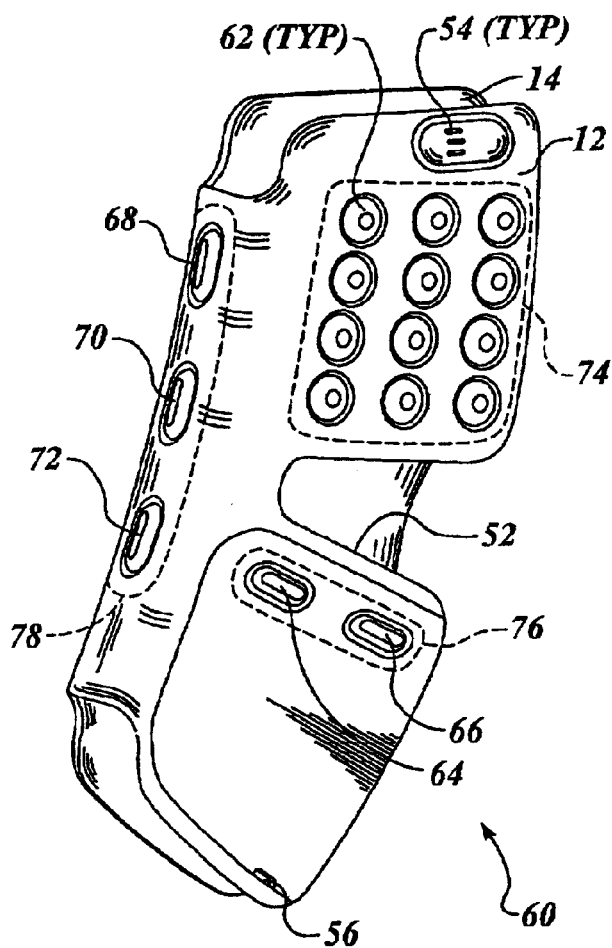
Figure 4C:
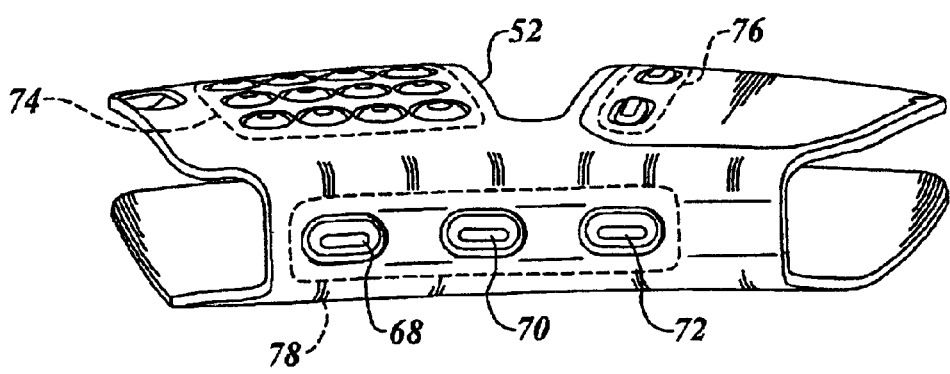

An interchangeable cover 60 in accordance with a second exemplary embodiment of the invention is shown in FIGS. 4A–C. In general, interchangeable cover 60 is substantially similar in configuration to interchangeable cover 10, except that interchangeable cover 60 includes "dumb" buttons that enable corresponding buttons built into the mobile phone (e.g., membrane switches 61 shown in FIG. 7A) to be actuated via a user pressing on the dumb buttons. Accordingly, like-numbered components in both sets of Figures perform substantially the same functions in both configurations.

The dumb buttons include a plurality of dumb keypad buttons 62, dumb input buttons 64 and 66, and dumb side input buttons 68, 70, and 72. In one embodiment, the input buttons comprise a thin membrane sheet in which a plurality of domes are defined, wherein each dome includes a center portion extending below the dome so as to activate membrane switches built into the mobile phone when the dome is pressed by a user. These membrane sheets, which are depicted in FIG. 4B as a membrane sheet 74, a membrane sheet 76, and a membrane sheet 78, may be secured to the underside of the cover using one of various assembly methods, such as using an appropriate adhesive, or may be held in place via the assembled components.

An interchangeable cover 80 in accordance with a third exemplary embodiment of the invention is shown in FIGS. 5A–C. In general, interchangeable cover 80 is substantially similar in configuration with interchangeable cover 60, except that interchangeable cover 80 includes customizable built-in buttons that are designed for a mobile phone that does not include built-in buttons or membrane switches. As before, like-numbered components perform substantially the same functions in both configurations.

The customizable buttons include a plurality of keypad buttons 82, input buttons 84 and 86, and side input buttons 88, 90, and 92. In one embodiment, the input buttons comprise sets of membrane switches, including keypad membrane switches 94, front face membrane switches 96, and side membrane switches 98. Each set of membrane switches may be secured to the underside of the cover using one of various assembly methods, such as using an appropriate adhesive, or may be held in place via the assembled components.

In order to receive user input, the various switches in interchangeable cover 80 must be electrically connected to the mobile phone over which the interchangeable cover is assembled. Accordingly, each of keypad membrane switches 94, front face membrane switches 96, and side membrane switches 98 includes wiring that couple that set of membrane switches to a connector 100 that is received by a mating connector on the mobile phone (not shown). Optionally, flex circuits may be used for routing signals from the membrane switches to the mobile phones. In general, connector 100 may provide a plurality of pins configured to support parallel data transferred, or may be configured to support serial data exchanges.

As discussed above, interchangeable covers 10, 60, and 80 are assembled to a mobile phone such that they "clasp"

around the profile of the phone. This assembly process is illustrated in FIGS. 6A and 6B. In one embodiment, the profile of the mobile phone (e.g., mobile phone 20), has a radiused trapezoid configuration, as illustrated by a trapezoid 102 in FIG. 6C. The trapezoid-shaped profile also includes radiused corners 104 and 106. As the leading edges of front face 12 and back face 14 contact radiused corners 104 and 106, respectively, upon the assembly of the interchangeable cover to the mobile phone, the leading edges of the front and back faces are caused to be spread apart, enabling the cover to be slid over the phone. As the user slides the cover further over the phone, the resilient material used for the cover causes the cover to return to its undeformed configuration, securing the cover to the phone.

In addition to securing the interchangeable cover to the mobile phone based on the phone's trapezoidal profile, other securing provisions may also be implemented. For example, in one embodiment a pair of "U"-shaped notches 108 and 110 are defined toward opposing ends of side portion 16, as shown in FIGS. 1B and 1E. Notches 108 and 110 are configured to engage with portions of peripheral lips defined in the front and back faces of the mobile phone over which the interchangeable cover is installed, such as shown by a peripheral lip 120 defined in a phone core 120 in FIGS. 7A and 7B. A substantially similar peripheral lip is formed into the backside of mobile phone 122, as well (not shown). In one embodiment, notch 108 includes shoulders 112 and 114, while notch 110 includes shoulders 116 and 118. Upon assembly, shoulder 112 engages a radius 124 formed in peripheral lip 120, while shoulder 114 engages a similar radius defined in the peripheral lip on the backside of the mobile phone. Similarly, shoulder 116 engages a radius 126 formed in peripheral lip 120, while shoulder 118 engages a similar radius defined in the peripheral lip on the backside of the mobile phone. Furthermore, as these radiused portion of the cover slide past their respective shoulders, an audible "click" is heard corresponding to a mechanical engagement of the adjacent features. Details of the assembled configuration are shown in FIGS. 2A and 2B.

A second means for providing assistance in securing the interchangeable cover to the mobile phone includes a plurality of cleats 128, which may be defined in a peripheral portion of the inside surfaces of either or both of front face 12 and back face 14, as shown in FIGS. 8A and 8B. As shown in the detail of FIG. 8B, in one embodiment each of latches 128 have a triangular profile. A set of adjacent (upon assembly) recessed designed to receive the latches are defined in the mobile phone. Upon assembly, latches 128 latch into respective recesses defined in the mobile phone to assist in securing the interchangeable cover to the mobile phone.

A third means for providing assistance in securing the interchangeable cover to the mobile phone comprises the use of one or more inwardly extending protrusions that are defined in front face 12 and/or back face 14. For example, such a protrusion 130 is shown in FIGS. 9A and 9B. A recess having a configuration adapted to receive the protrusion is defined in the mobile phone such that the protrusion(s) fit into (a) respective recess(es) defined in the front and/or back sides of the mobile phones. As depicted in FIGS. 9a and 9B, in one embodiment speaker slot 54 are defined within a protrusion.

Mobile phone 122 may also include a display 132 in which text and or graphical data are displayed. For example, display 132 may comprise an LCD. Accordingly, interchangeable covers 10, 60, and 80 may include a cutout 132 configured to provide viewing access to display 132 upon assembly, as shown in FIG. 10. Optionally, a lens 134, preferably made of a clear, impact resistant material, may be disposed in cutout 132.

In addition to mobile phones, the interchangeable cover of the present invention may also be adapted to attach to other types of mobile communication devices, including PDAs, pocket PCs, and two-way wireless pagers, such as the Blackberry devices produced by the Research In Motion Corporation. For example, an exemplary embodiment in which an interchangeable cover 150 is secured to a PDA 152 is shown in FIG. 11. Similar to the interchangeable cover embodiments discussed above, interchangeable cover 150 comprises a resilient semi-rigid shell including front and back portions 154 and 156 coupled to a side portion 158, wherein the shell has a substantially "U"-shaped profile. Interchangeable cover 150 further includes an aperture 160 through which an LCD display 162 on PDA 152 can be seen, and a cutout 164 adapted to allow buttons 166, 168, 170, 172, and 174 on PDA 152 to pass upon assembly of the interchangeable cover to the PDA. Optionally, a respective cutout for each PDA button may be provided (not shown).

Another exemplary embodiment in which an interchangeable cover 180 is secured to a two-way wireless pager 182 is shown in FIG. 11. As before, interchangeable cover 150 comprises a resilient semi-rigid shell including front and back portions 184 and 186 coupled to a side portion 188, wherein the shell has a substantially "U"-shaped profile. Interchangeable cover 180 further includes an aperture 190 through which an LCD display 192 on two-way wireless pager 182 can be seen, and a cutout 194 adapted to allow pager keypad buttons 196 and input buttons 198, 200, and 202 on the two-way wireless pager to pass upon assembly of the interchangeable cover to the pager.

Another feature of the interchangeable cover of the present invention concerns graphics and/or advisements that may be added to the cover. The three-sided wrap-around configuration of the interchangeable covering has an advantage over single face covers by providing more surface area to display content without detracting from the ornamental design of the cover. In addition to pure design elements, the additional surface area provides space to display advertisements, company logos or symbols, and information of benefit to various entities. For example, a business may distribute coverings for free or low cost, where the coverings contain one or more advertisements or logos pertaining to the business along with ornamental designs. The information may include phone numbers, URLs, or email addresses. A sports team may distribute covers that have the team schedule on a portion of the back, along with ornamental designs on the remaining surface areas. The additional surface area provides space to include advertisements, logos, and information pertaining to multiple business or organizational entities. A sponsor or distributor of coverings may include business elements from multiple businesses in exchange for compensation from the businesses or their agents. In general, the graphics for a given interchangeable cover may include one or more advertisement logos, such as logos 204 and 206 shown in FIGS. 13A and logo 208 shown in FIG. 13B. Typically, the logos will be displayed on back 14 of the interchangeable cover.

As discussed above, the interchangeable covers of the invention comprises a resilient semi-rigid shell. Preferably, the cover will be made of a material with resilient properties, such as various plastics including polycarbonate, acrylonitrile butadiene styrene (ABS), or a polycarbonate/ABS blend. When a plastic is used, the interchangeable cover may be manufactured using well-known plastic manufacturing techniques, such as injection-molding.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An interchangeable cover for a mobile communications device comprising:
   a resilient semi-rigid shell including a front face and back face commonly connected to a side portion and having a substantially U-shaped profile adapted to wrap around a substantial portion of a front, back and side of the mobile communications device upon assembly over the mobile communications device, and
   wherein the mobile communications device includes a display and the front face of the resilient semi-rigid shell further includes an aperture defined therein that enables a user to view the display when the interchangeable cover is assembled over the mobile communications device.

2. The interchangeable cover of claim 1, wherein the resilient semi-rigid shell is adapted to be secured to the mobile communications device without any fasteners.

3. The interchangeable cover of claim 1, wherein the mobile communications device has a profile that is substantially trapezoidal in shape and the substantially U-shaped profile of the resilient semi-rigid shell is configured such that a distance between the front face and the back face is greater at a root of the U than at end of the U such that the resilient semi-rigid shell is adapted to clasp around the trapezoidal profile of the mobile communications device upon assembly of the interchangeable cover over the mobile communications device.

4. The interchangeable cover of claim 1, wherein the mobile communications device includes a keypad including a plurality of keypad buttons, and the front face of the interchangeable cover includes a plurality of openings through which respective keypad buttons extend upon assembly of the interchangeable cover over the mobile communications device so as to enable a user to activate the keypad buttons.

5. The interchangeable cover of claim 1, further comprising a keypad operatively coupled to the front face including a plurality of keypad buttons, and means for coupling signals produced via an activation of said plurality of keypad buttons to the mobile communications device.

6. The interchangeable cover of claim 1, wherein the mobile communications device includes a set of keypad buttons and one or more input buttons apart from the set of keypad buttons, and wherein the front face of the interchangeable cover includes one or more openings defined therein through which said one or more input buttons pass upon assembly of the interchangeable cover over the mobile communications device to enable a user to activate said on or more input buttons.

7. The interchangeable cover of claim 1 wherein the mobile communications device includes a keypad including a plurality of keypad switches, further comprising a membrane operative coupled upon assembly to an inside of the front face including a plurality of dumb buttons that are used to activate corresponding respective keypad switches on the mobile communications device.

8. The interchangeable cover of claim 7, wherein the mobile communications device further includes on or more input switches apart from the plurality of keypad switches, further comprising a membrane operatively coupled upon assembly to an inside portion of the resilient semi-rigid side including one or more dumb buttons that are used to activate corresponding respective input switches on the mobile communications device.

9. The interchangeable cover of claim 8, wherein said one or more input switches include a plurality of switches disposed on a side of the mobile communications device.

10. The interchangeable cover of claim 1, further including a lens disposed within the aperture.

11. The interchangeable cover of claim 1, further including a cutout region defined in the front face extending inwardly from a mid-portion thereof to enable actuation of one or more input buttons disposed on a font side of the mobile communications device upon assembly of the interchangeable cover over the mobile communications device.

12. The interchangeable cover of claim 11, wherein the cutout region comprises a radiused-V-shape configuration extending across a substantial portion of the front face.

13. The interchangeable cover of claim 1, further comprising a first substantially U-shaped cutout defined in the side portion so as to extend upwardly from a first end of the side portion, said first substantially U-shaped cutout defining respective shoulders in the front and back faces.

14. The interchangeable cover of claim 13, further comprising a second substantially U-shaped cutout defined in the side portion so as to extend from a second end of the side portion opposite of the first end, said second substantially U-shaped cutout defining respective shoulders in the front and back face.

15. The interchangeable cover of claim 1, wherein the mobile communications device includes one or more side input buttons disposed on a side of the mobile communications device that is substantially covered by the side portion of the semi-rigid shell upon assembly, further including one or more corresponding openings defined in the side portion through which said one or more side input buttons respectively pass upon assembly to enable a user to activate said one or more side input button(s).

16. The interchangeable cover of claim 1, further comprising at least one input button operatively coupled to the front face of the resilient semi-rigid shell and means for coupling signals produced via an activation of said at least one input button to the mobile communications device.

17. The interchangeable cover of claim 1, further comprising at least one input button operatively coupled to the back face of the resilient semi-rigid shell and means for coupling signals produced via an activation of said at least one input button to the mobile communications device.

18. The interchangeable cover of claim 1, further comprising at least one input button operative coupled to the side portion of the resilient semi-rigid shell and means for coupling signals produced via an activation of said at least one input button to the mobile communications device.

19. The interchangeable cover of claim 1, further comprising one or more inwardly extending protrusions defined in at least one of the front face and/or back face that are adapted to fit into (a) respective recess(es) defined and/or back side of the mobile communications device upon assemble of the interchangeable cover over the mobile communications device.

20. The interchangeable cover of claim 1, further comprising a plurality of inwardly extending cleats defined in at least one of the front face and/or back face that are adapted to engage respective recesses defined in a front and/or back side of the mobile communications device upon assemble of the interchangeable cover over the mobile communications device so as to assist in securing the interchangeable cover to the mobile communications device.

21. The interchangeable cover of claim 1, wherein the front face further includes a plurality of speaker slots that are used to enable audible speaker signals produced by the mobile communications device to pass through the interchangeable cover upon assembly to the mobile communications device.

22. The interchangeable cover of claim 1, wherein the front face further includes a microphone slot configured to enables verbal user input to be received by a microphone disposed within the mobile communications device.

23. The interchangeable cover of claim 1, further comprising:
   an ornamental design disposed over the front face; and
   a design containing indicia corresponding to at least one business entity on the back face.

24. The interchangeable cover of claim 1, further comprising:
   an ornamental design over the front face; and
   a first design containing indicia corresponding to a first business entity disposed on the back face; and
   a second design containing indicia corresponding to a second business entity disposed on the back face.

25. The interchangeable cover of claim 1, wherein the mobile communications device comprises a cellular phone.

26. The interchangeable cover of claim 1, wherein the mobile communications device comprises a personal data assistant.

27. The interchangeable cover of claim 1, wherein the mobile communications device comprises a two-way pager.

28. The interchangeable cover of claim 1, wherein the mobile communications device comprises a pocket PC.

29. The interchangeable cover claim 1, wherein the resilient semi-rigid shell has an arcuate segment configuration when viewed from a plan view.

30. An interchangeable cover for a mobile communications device having a body with a substantially tetrahedral profile, a front peripheral lip defined around a peripheral portion of a front of the body and a back peripheral lip defined around a peripheral potion of a back of the body, comprising:
   a resilient semi-rigid shell including a front face and a back face commonly connected to a side portion and having substantially U-shaped profile adapted to wrap around a substantial portion of the front, back and side of the body of the mobile communications device and being secured to the mobile communications device by means of extending portions of the front and back faces that clasp around the substantially tetrahedral profile of the body, and whereupon assembly exterior edges of the front face and back faces are disposed adjacent to the front and back peripheral lips, respectively.

31. The interchangeable cover of claim 30, further including a radiused V-shaped cutout region defined in the front face extending inwardly from a mid-portion thereof to enable actuation of one or more input buttons disposed on the front of the mobile communications device upon assembly of the interchangeable cover over the mobile communications device.

32. The interchangeable cover of claim 30, further comprising a pair of substantially U-shaped cutouts defined in the side portion so as to extend inwardly from opposing ends of the side portion, each of said substantially U-shaped cutouts defining respective pairs of shoulders in the front and back faces of the resilient semi-rigid shell that are disposed adjacent inwardly extending portions of the front and back peripheral lips so as to partially encapsulate each of the front and back faces within the front and back peripheral lips upon assembly.

33. The interchangeable cover of claim 30, further comprising a pair of substantially U-shaped cutouts defined in the side portion so as to extend inwardly from opposing ends of the side portion, each of said substantially U-shaped cutout defining respective pairs of shoulders in the front and back faces of the resilient semi-rigid shell that are disposed adjacent inwardly extending portions of the front and back peripheral lips so as to partially encapsulate each of the font and back faces within the front and back peripheral lips upon assembly.

34. The interchangeable cover of claim 33, wherein an audible click is produced when the shoulders of the resilient semi-rigid shell pass over adjacent mating portions defined in the peripheral lip of the mobile communications device upon assembly of the interchangeable cover to the mobile communications device.

35. The interchangeable cover of claim 30, wherein the mobile device includes a keypad including a plurality of keypad switches, further comprising a membrane operative coupled upon assembly to an inside of the front face including a plurality of dumb buttons that are used to activate corresponding respective keypad switches on the mobile communications device.

36. The interchangeable cover of claim 35, wherein the mobile communications device further includes one or more input switches apart from the plurality of keypad switches, further comprising a membrane operatively coupled upon assembly to an inside portion of the resilient semi-rigid side including one or more dumb buttons that are used to activate corresponding respective input switches on the mobile communication device.

37. The interchangeable cover claim 30, wherein the mobile communications device includes a display and the front face of the resilient semi-rigid shell further includes an aperture defined therein that enables a user to view the display when the interchangeable cover is assembled over the mobile communications devices.

38. The interchangeable cover claim 37, further including a lens disposed within the aperture.

39. A method of distributing advertisements comprising:
   authorizing manufacture of a plurality of interchangeable phone covers adapted to be attached to compatible mobile communications devices, each interchangeable cover comprising a surface having an advertisement of an advertiser;
   distributing the interchangeable phone covers to end users for attachment to compatible mobile communications devices used by the end users; and
   receiving compensation from said advertiser.

40. The method of claim 39, wherein either the advertisement comprises at least a selected one from the group consisting of a phone number, an URL and an email address, or the advertiser is a sponsor.

* * * * *

UNITED STATES PATENT AND TRADEMARK OFFICE
CERTIFICATE OF CORRECTION

PATENT NO. : 6,975,888 B2
APPLICATION NO. : 09/933858
DATED : December 13, 2005
INVENTOR(S) : Joshua R. Buesseler and William K. Ford It is certified that error appears in the above-identified patent and that said Letters Patent is hereby corrected as shown below:

Column 1
Line 42, "...item may contain known a well known..." should read --... item may contain a well known...--.
Line 52, "...two-way pages..." should read --...two-way pagers...--.

Column 7
Line 8, "...recognize. These..." should read --...recognize. ()These...--.
Line 64, "...said on or more..." should read --...said one or more...--.

Column 8
Line 7, "...includes on or more..." should read --... includes one or more...--.
Line 22, "...on a font side..." should read --...on a front side...--.
Line 30, "...extend upwardly from..." should read --...extend inwardly from...--.
Line 38, "...front and back face." should read --...front and back faces.--.
Line 66, "...recess(es) defined and/or back side..." should read --...recess(es) defined in a front and/or back side...--.

Column 9
Line 37, "...personal data assistant." should read --...personal digital assistant.--.
Line 43, "...cover claim 1..." should read --... cover of claim 1...--.
Line 61, "...the front face and back faces..." should read --...the front and back faces...--.

Column 10
Line 9, "...disposed adjacent inwardly..." should read --...disposed adjacent to inwardly...--.
Line 17, "...U-shaped cutout..." should read --...U-shaped cutouts...--.
Line 19, "...disposed adjacent inwardly..." should read --...disposed adjacent to inwardly...--.
Line 20, "...font and back..." should read --...front and back...--.
Line 31, "...membrane operative coupled..." should read --...membrane operatively coupled...--.
Line 32, "...assembly to an inside of ..." should read --...assembly to the inside of...--.
Line 44, "...cover claim 30..." should read --...cover of claim 30...--.

UNITED STATES PATENT AND TRADEMARK OFFICE
CERTIFICATE OF CORRECTION

PATENT NO. : 6,975,888 B2
APPLICATION NO. : 09/933858
DATED : December 13, 2005
INVENTOR(S) : Joshua R. Buesseler and William K. Ford It is certified that error appears in the above-identified patent and that said Letters Patent is hereby corrected as shown below:

Column 10 (cont'd)
Line 50, "...cover claim 37..." should read --...cover of claim 37...--.

Signed and Sealed this

Eighth Day of May, 2007

JON W. DUDAS
*Director of the United States Patent and Trademark Office*